United States Patent Office 2,760,766
Patented Aug. 28, 1956

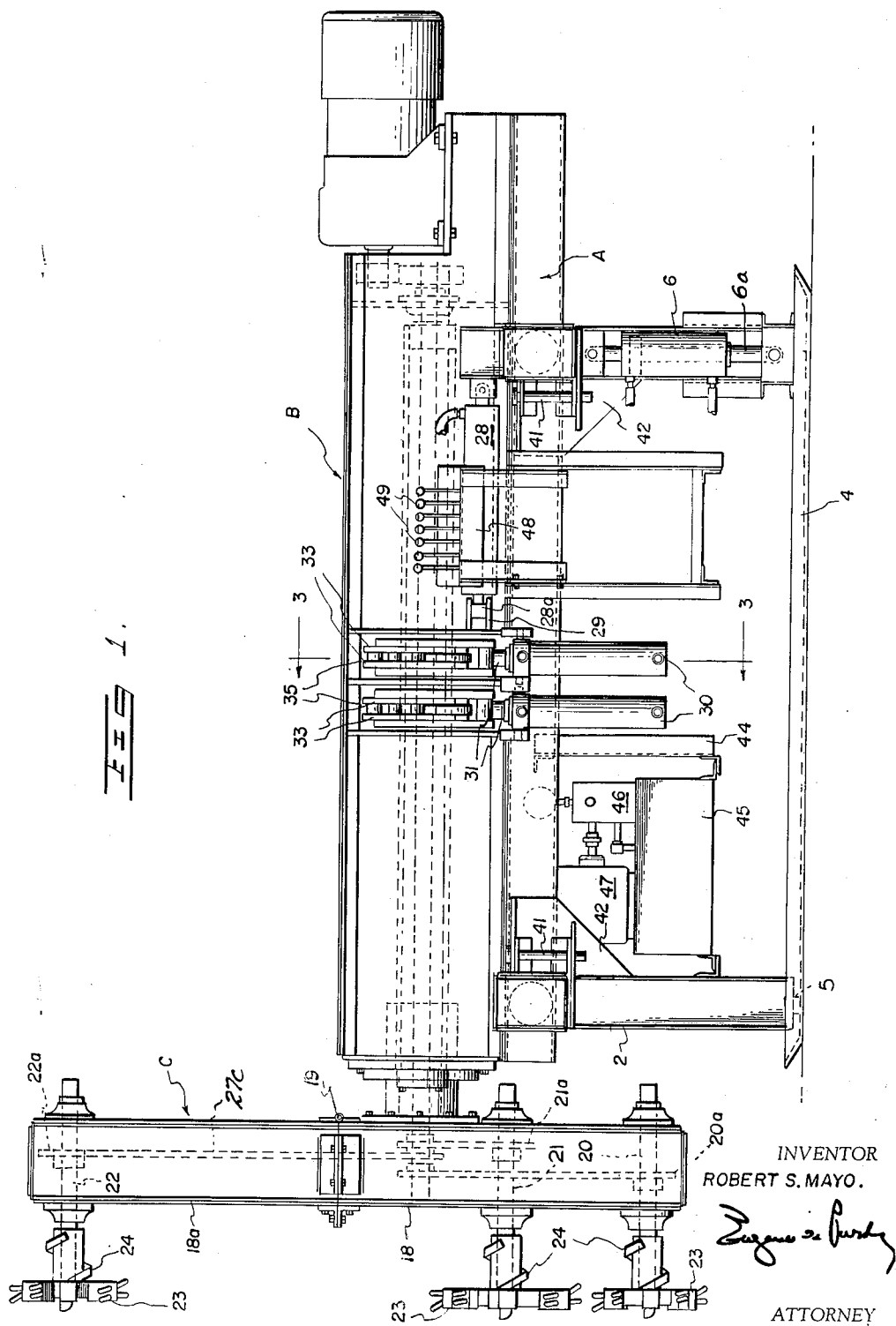

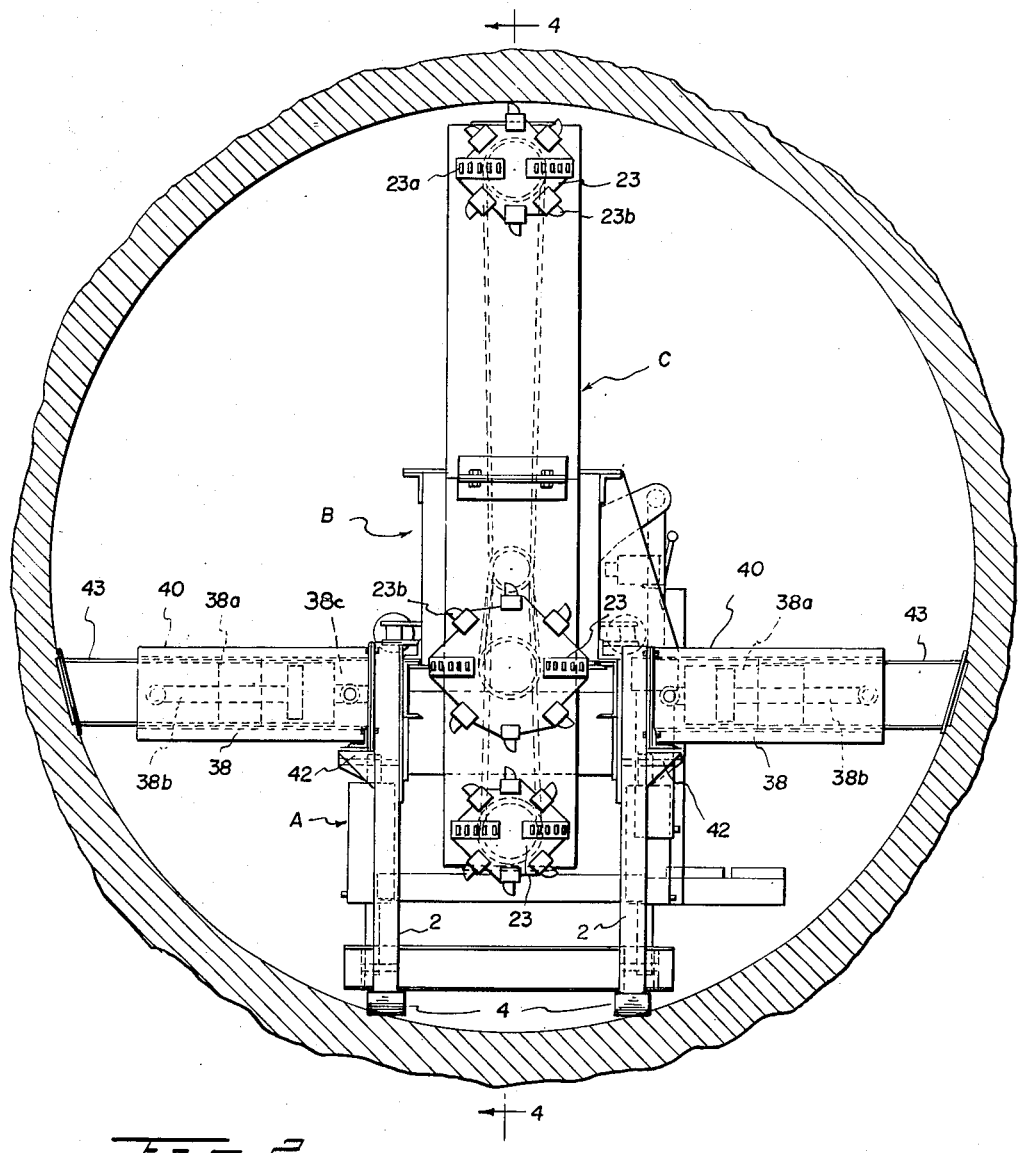

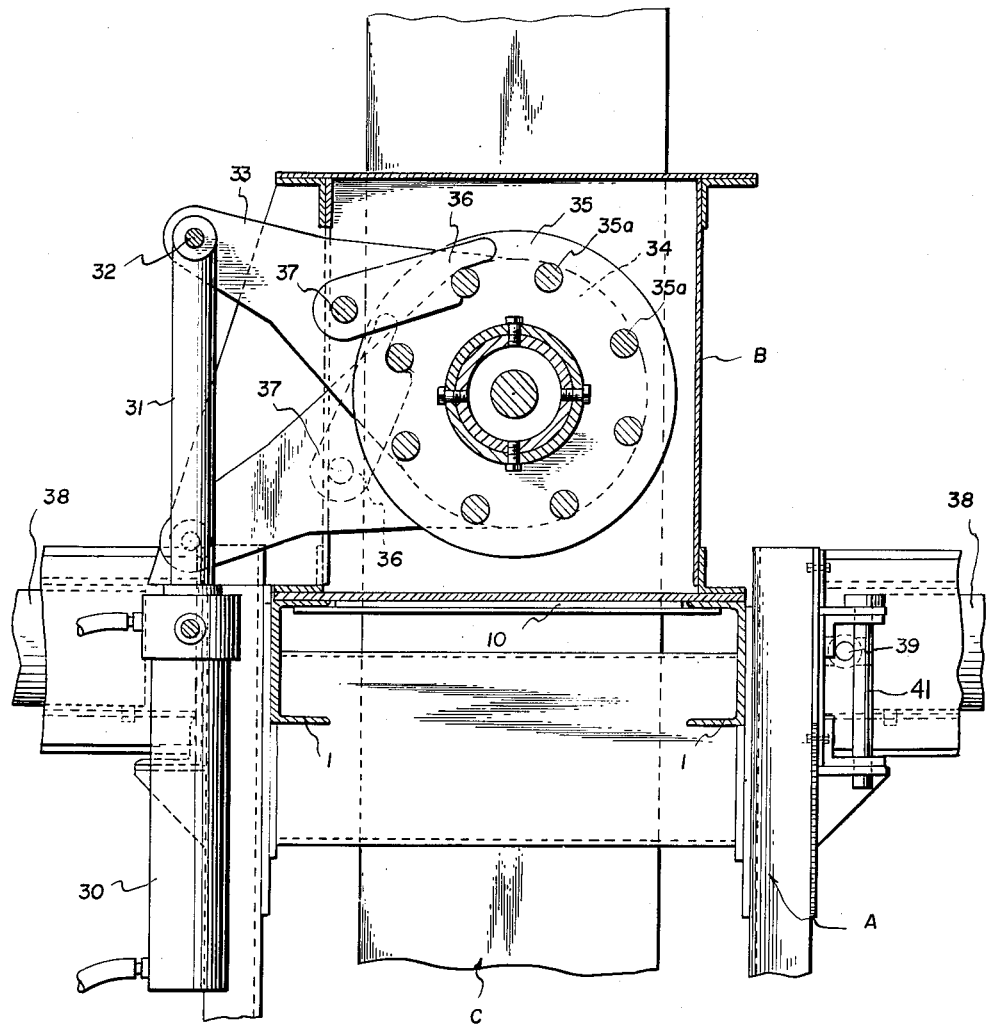

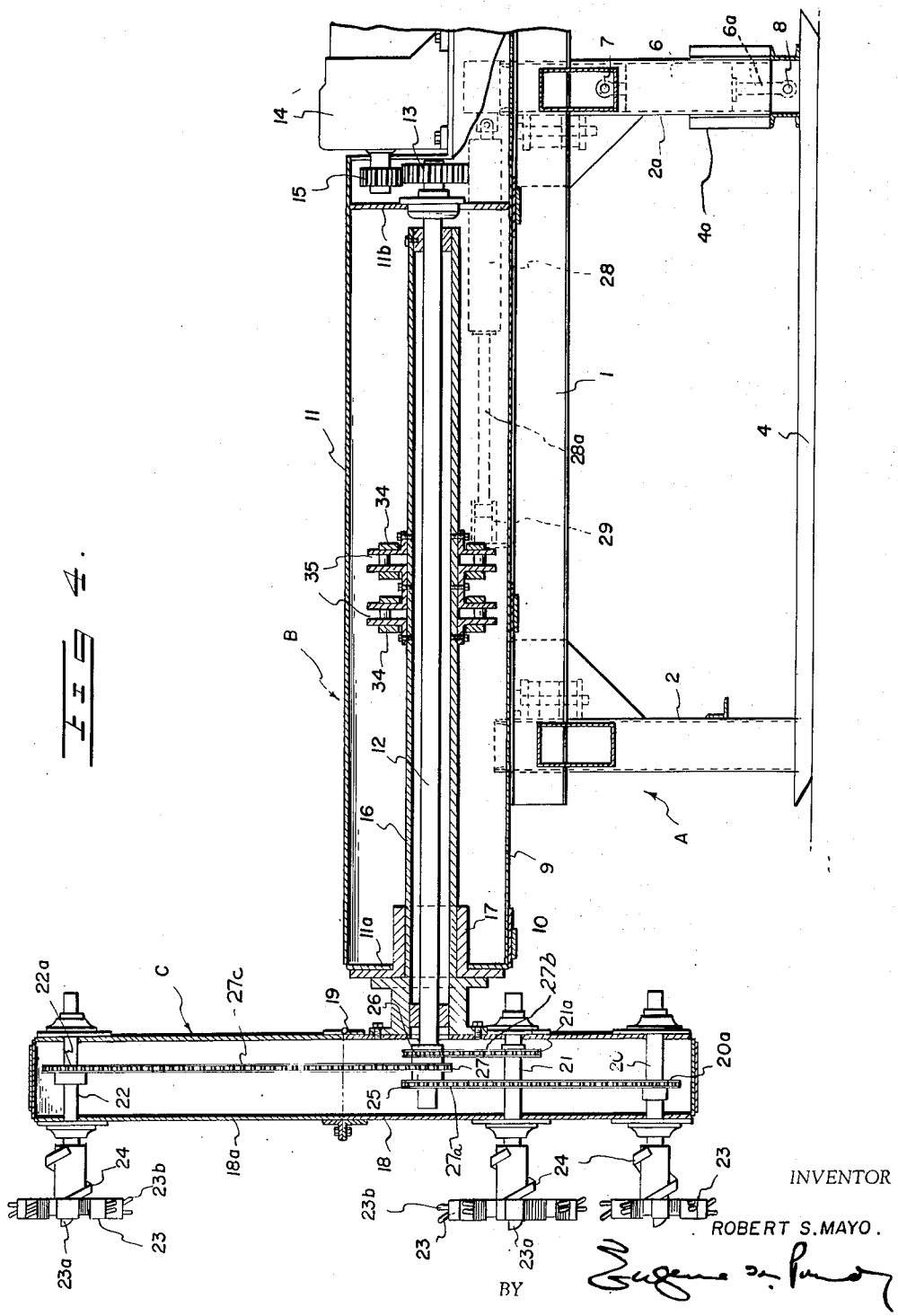

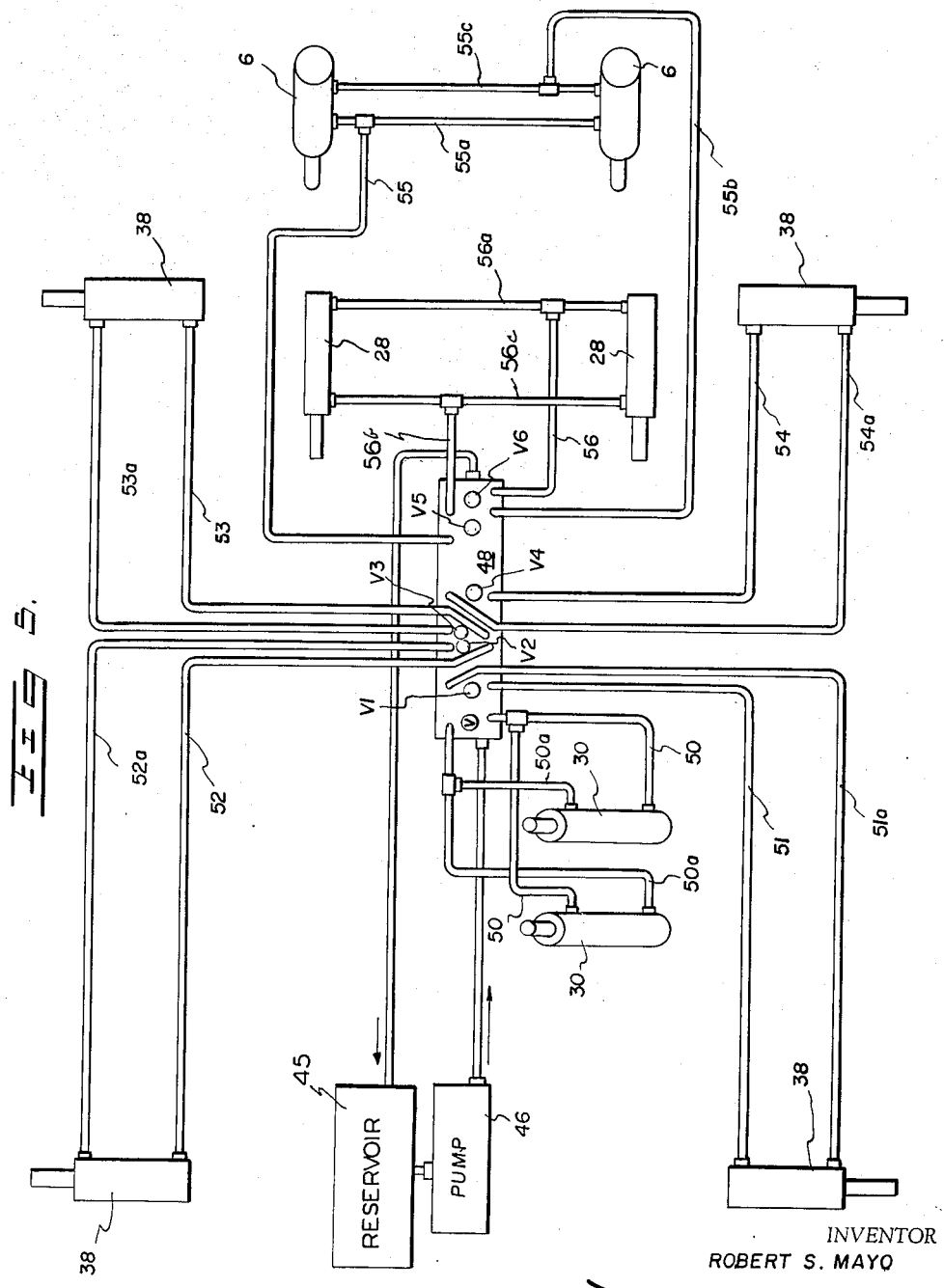

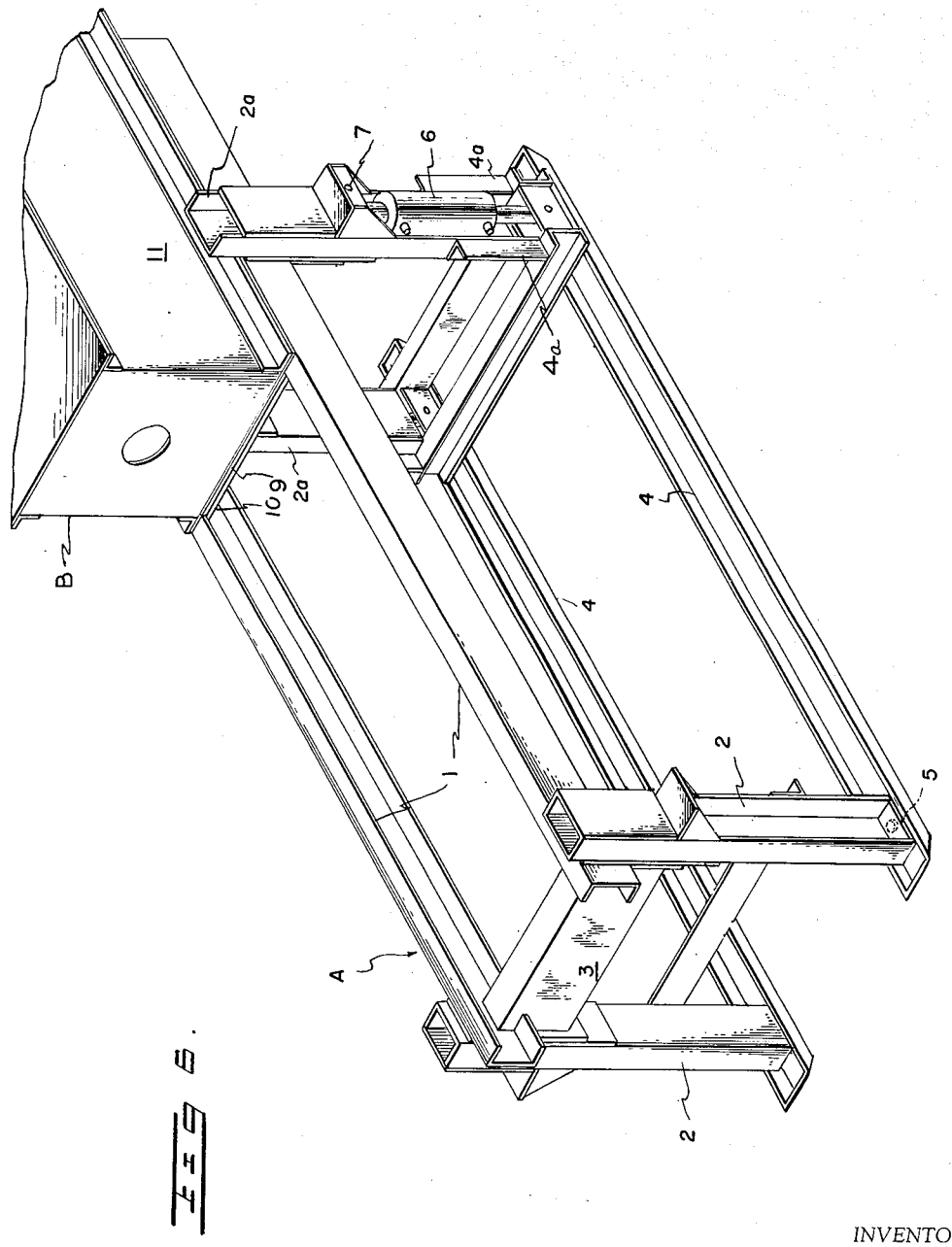

2,760,766

TUNNEL EXCAVATOR HAVING ROTARY CUTTERS MOUNTED UPON A ROTATABLE CUTTING HEAD

Robert S. Mayo, Lancaster, Pa.

Application June 29, 1954, Serial No. 440,002

7 Claims. (Cl. 262—7)

This invention relates to tunnel excavators of the general type in which a series of rotary cutters are mounted upon a rotatable cutting head which is advanced against the face of the tunnel to remove earth or stone from the face and thus to progressively extend the length of the tunnel.

While tunnel excavators of this general type are old, it is the aim of the present invention to provide a machine which is better adapted for its purpose and by which the work of driving a tunnel, even through rock, may be performed with the minimum expenditure of time and man-power.

An important object of the invention is to provide a tunnel excavator of the above character in which the cutting head is advanced against the face of the tunnel periodically instead of continuously, so as to cause each of the individual cutters carried by the head to bore countersinks in the face of the tunnel. Then by slowly and intermittently rotating the cutting head, the cutters travel through concenric paths to cut a series of juxtaposed circular kerfs or channels in the face of the tunnel. The slabs of material between the kerfs disintegrate under their own weight and are carried away from the tunnel face in any suitable manner, as by a conveyor. In order to best accomplish the above tunnel driving operation, each cutter is preferably provided with cutting teeth upon both its operating face and its periphery; and each cutter is rotated at relatively high speed and independently of the circular movement of the cutting head.

Another object of the present invention is to provide a tunnel excavator in which the rotary cutters mounted upon the rotatable cutting head are continuously driven and in which rotary motion is periodically, and under the control of an operator, transmitted to the cutting head by a ratchet mechanism which applies a powerful torque to the rotary shaft carrying the head.

An additional object of the invention is to provide a tunnel excavator of the above character in which the cutting head comprises two or more sections connected in a manner such that the outermost section or sections of the arm may be displaced in out-of-the-way position to permit the excavator to be moved into and out of a tunnel with the least amount of trouble.

Still another object of the invention is to provide a tunnel excavator of the above character in which the rotary shaft carrying the cutting head may be inclined in horizontal or vertical planes to change the direction of drive of the tunnel.

Other objects and advantages will be apparent from the following detailed description considered in connection with the accompanying drawings in which:

Figure 1 is a side elevational view of a tunnel excavator;

Figure 2 is a head-on end view of the excavator;

Figure 3 is a transverse cross-sectional view of the excavator taken on the line 3—3 of Figure 1;

Figure 4 is a longitudinal cross-sectional view of the excavator taken on the line 4—4 of Figure 2;

Figure 5 is a schematic view of the valve-operating system; and

Figure 6 is a simplified schematic view of the machine frame.

The tunnel excavator illustrated in the drawings comprises generally a machine frame A, a carriage B slidable upon the top of the machine frame, and a rotatable cutting head C mounted upon the forward end of the frame adapted to be disposed opposite the face of a tunnel.

The machine frame A, as shown in Fig. 6 in stripped skeleton form, is of generally rectangular shape and is made up almost entirely of channel members. The top of the frame consists of a pair of horizontal rails 1 constituted of reversely-disposed channel members extending longitudinally of the frame. These rails are supported at their opposite ends upon vertical channel members providing pairs of forward and rear legs 2 and 2a respectively, each pair of legs being connected by cross-channels 3. The legs are supported upon a pair of skids 4, which skids are fashioned from channel members and extend longitudinally of the frame. The forward pair of legs 2 rest upon buttons or washers 5 which provide fulcrums about which the frame may be tilted forwardly. Nested within the channels of the pair of rear legs 2a are hydraulic jacks, the cylinders 6 of which at their upper ends are pivoted to pins 7 carried by the legs 2a, and the piston rods 6a of which are pivoted to pins 8 upon the skids 4. The lower ends of the legs 2a are slidable within guide pockets 4a constructed upon the skids. The jacks are adapted to be operated simultaneously for raising and lowering the rear legs in their pockets to tilt the frame as a unit upon the buttons 5.

The carriage B comprises a rectangular plate 9 slidable upon the rails 1 and has guide elements 10 receiving the inturned flanges of the rails for guiding the plate back and forth along the rails. A box-shaped housing 11 is secured to the plate for sliding movement therewith. Extending longitudinally throughout the length of the housing and beyond the end walls 11a and 11b thereof is a cutter drive shaft 12. Fixed upon the trailing end of the cutter drive shaft exteriorly of the end wall of the housing is a spur gear 13. An electric motor 14 secured to the plate 9 has a smaller spur gear 15 secured to its armature shaft which is in driving engagement with the gear 13 on the cutter drive shaft.

The cutter drive shaft 12 is enclosed within a hollow, cylindrical head drive shaft 16 which terminates at one end short of the end of cutter drive shaft 12 carrying the pinion 13 and at its other end projects outwardly through the forward wall 11a of the housing 11 through a sleeve bearing 17 where it is rigidly secured to the cutting head C.

The rotatable cutting head C comprises a flat elongated, box member of rectangular cross-section and made in two sections 18 and 18a which are hinged together at 19 on their rear walls so that one section 18a may be folded backward toward the other section 18. The cutting head is non-centrally mounted upon the head drive shaft 16; that is to say, one radial arm of the head, namely the arm carrying the hinged section 18a, is somewhat longer than the other radial arm of the head. Extending between and rotatably mounted between the forward and rear walls of the cutting head are three sprocket shafts 20, 21 and 22 carrying sprockets 20a, 21a and 22a, respectively, two of these sprocket shafts 20 and 21 being located on one arm of the cutting head and the remaining sprocket shaft 22 being located adjacent the outer end of the other arm of the cutting head. Each sprocket shaft projects outwardly through the forward wall of the cutting head and is provided with a flat, disk-shaped rotary cutter 23 with the outer faces of all three cutters lying in a common vertical plane. Each cutter is provided upon its forward cutting face and upon its circumferential rim with cutting teeth 23a and 23b, respectively, and the sprocket shaft adjacent the rear or non-cutting face of the cutter is formed with a worm 24 for extracting the cuttings.

Within the enclosure of the carrier C there are mounted upon the drive shaft 12 three sprockets 25, 26 and 27. Transmission chains 27a, 27b and 27c extend between the pairs of sprockets 25 and 20a, 26 and 21a, and 27 and 22a, respectively, by which rotation of the cutter drive shaft 12 simultaneously rotates each of the cutters 23.

For projecting the cutting head C forwardly to take fresh bite in the face of the tunnel there is provided a pair of hydraulic jacks 28 mounted upon opposite sides of the carriage B each jack having one end pivoted to the machine frame A and its piston rod 28a pivoted to wings 29 on the carriage, as indicated in Figs. 1 and 4.

The head drive shaft 16 is intermittently rotated by a ratchet mechanism comprising a companion pair of vertically-disposed hydraulic ratchet cylinders 30 supported on the carriage B and each having a piston rod 31 connected to the piston within the cylinder. As best shown in Fig. 3, the upper end of each piston rod is pivotally connected to a pin 32 which extends laterally between a pair of parallel, relatively closely spaced levers 33 which constitute radial extensions of rings 34 that snugly encircle and rotate upon the head drive shaft. Between each pair of rings is a ratchet wheel 35 embracing and secured to the circumference of the head drive shaft. A pawl 36 is pivoted to a pin 37 extending between each pair of levers and is adapted to engage rungs 35a of the ratchet wheel during the upthrust of the piston rod. The series of rungs of the two ratchet wheels are angularly offset relative to each other and pressure fluid is adapted to be alternately admitted to the cylinders 30, so that while one pawl is engaging the rung of its ratchet wheel to impart a partial turning movement to the head drive shaft 16, the other ratchet is being retracted. Thus, by the successive and alternate operation of the cylinders, the head drive shaft, and consequently the cutting head, is slowly and intermittently rotated.

In order to firmly anchor the machine in place during its operation, four hydraulic jacks 38 (Fig. 2) are provided in pairs located at opposite ends of and upon opposite sides of the machine. The jacks are housed within tubular sleeves 40 and each jack comprises a cylinder 38a and a piston 38b connected to the piston reciprocable within the cylinder. Each sleeve is hinged at one end upon a vertical pin 41 mounted upon brackets 42 on the machine frame A so that the sleeve and jack is free to swing in a horizontal plane from a position parallel to the frame to a position at right-angles to the frame. The jack cylinders are pivotally connected at one end to pins 38c inside the sleeves and pivotally connected to the outer end of each piston rod is a ram shoe 43 which upon admission of fluid to the cylinder with the jack disposed in extended position is adapted to be projected against a side wall of the tunnel. The pair of jacks upon opposite sides of the machine frame are located in horizontal alignment so that the reaction pressure of one is counterbalanced by the other. Thus, when the four jacks are fully extended under pressure, the machine is strongly and rigidly braced at its opposite ends between the side walls of the tunnel.

Suitably supported by a bracket 44 upon the machine frame at an elevation below the rails 1 is a fluid reservoir 45 including a pump 46 driven by an electric motor 47, for supplying the fluid (for example, oil) from the reservoir to and from the cylinders of the jacks. The control means for operating the valves for admitting and removing pressure fluid to and from the various cylinders is indicated diagrammatically in Fig. 5.

Mounted upon the machine frame A is a valve box 48 containing a series of valves adapted to be manually operated by valve rods 49 which project outside the valve box alongside the frame in a convenient position for operation by the machine operator. By turning the valve V to one position, pressure fluid is delivered from the pump 46 through fluid lines 50 to one end of the ratchet cylinders 30 while by turning this valve to another position, fluid is delivered from the pump through line 50a to the other end of the ratchet cylinders. It will be noted that the lines 50 and 50a are connected to opposite ends of the two cylinders 30 so that while the piston in one cylinder is moving in one direction, the piston in the other cylinder is moving in the reverse direction. Thus, as the piston of one cylinder is executing a working stroke the piston of the other cylinder is undergoing an idling or retracting stroke. In this manner the ratchet mechanism 37 is alternately actuated to impart turning movement to the head drive shaft 16 under the control of the operator handling the valve mechanism.

The valve $V^1$ controls the admission of pressure fluid to either lines 51 or 51a leading to one of the jacks 38 for actuating a ram 43, the valve in one position introducing pressure to one end of the cylinder and in another position admitting pressure to the opposite end of the cylinder. In the same way valves $V^2$, $V^3$ and $V^4$ control the admission of pressure fluid to the other three jacks 38 via the companion lines 52 and 52a, 53 and 53a and 54 and 54a. It is desirable that these valves be independently operable in order to project the rams different distances to bring them into solid contact with the side walls of the tunnel and, by equal movement of opposite pairs of jacks, the machine may be shifted sideways for steering.

The valve $V^5$ controls admission of fluid to the cylinders 6 of the jacks for tilting the machine frame out of a horizontal position. In one position of this valve, pressure fluid passes through line 55 and branch line 55a to one end of the pair of cylinders 6, and in another position of the valve, pressure is admitted to the opposite ends of the cylinders via line 55b and branch line 55c. These jacks are operated simultaneously.

In a like manner to valve $V^5$, the valve $V^6$ is arranged so that in one position pressure fluid is simultaneously admitted through line 56 and branch line 56a to one end of the two cylinders 28 for shifting the carriage C forwardly; and in another position of the valve, pressure fluid is directed through the line 56b and branch line 56c to the opposite ends of these cylinders to retract the jacks.

In this hydraulic circuit, as in the others just described, the fluid evacuated from the cylinders is returned to the reservoir 45 via the lines not connected to pressure. No attempt has been made to describe mechanical details common to hydraulic systems which are well-known in the art and which could of course be employed to carry into effect the principle of operation just described.

The operation of the tunnel excavator described above is as follows: Tracks having been laid to the face of the tunnel where work is to be begun, the frame A is trammed to a position just in advance of the tunnel face and then lowered onto the skids 4.

Next, the four sleeves 40 are swung out from the sides of the machine so as to extend horizontally and fluid is admitted to the jack cylinders 38 to project the ram shoes 43 tighly up against the side walls of the tunnel, whereby the machine is firmly anchored in place in the tunnel. Fluid is then admitted to the cylinders of the vertical jacks 6 to line up the cutting head with the intended direction of advance of the tunnel excavation.

Now the motor 14 which is connected to a source of electrical current is set in operation and this motor by its connection through the gears 15 and 13 rotates the cutter drive shaft 12. Through the chain transmissions 27a, 27b and 27c winding between the sprockets upon the cutter drive shaft 12 and the sprocket shafts 20, 21 and 22, rotation at comparatively high speed is imparted to the cutters 23.

Fluid is admitted to the cylinders of the hydraulic jacks 28 to slowly slide the carriage B forwardly upon its bed whereupon the three cutters 23 mill recesses in the face of the tunnel to a relatively shallow depth, but in excess of the thickness of the cutters, at which time admission of fluid to the cylinders 28 is cut off and further advance of the carriage arrested.

With the jacks 28 holding the carriage against retrograde movement, the machine operator opens the fluid pressure line to the ratchet cylinders 30, which causes operation of the ratchet mechanism for imparting a partial rotation to the head drive shaft 16. As the cutting head slowly rotates under the control of the machine operator who manipulates the valves V, the cutters 23, by virtue of the teeth 23b provided upon their rims, cut a series of concentric circular kerfs or channels in the face of the tunnel. The earth and rock excavated by the cutters is fed by the worms 25 to the outer face of the tunnel where it is removed from the tunnel by a conveyor (not shown) or any other means.

After the cutting head has made a complete revolution, rotation of the cutters and the cutting head is arrested by stopping the motor 14 and by cutting off the admission of fluid to the ratchet cylinders 30.

Again the cutters 23 are set in operation by starting the motor 14 and the carriage B is moved forwardly by admitting fluid to the jacks 28 which causes the cutters 23 to take a fresh bite in the face of the tunnel.

The ratchet cylinders are connected to fluid pressure to cause the cutting head to again make a full sweep of the tunnel face removing another slab of earth and rock from the face. This cycle of operation is repeated until the cutting head has advanced the full stroke of the jacks 28 at which time the ram shoes 43 are released and the jacks 28 retracted, and the entire machine supported on its skids 4 is shifted bodily toward the face of the tunnel preparatory to starting a new drive.

When the center line of the projected tunnel is to take an upward or downward inclination, this is accomplished by raising or lowering the rear end of the frame through the operation of the pairs of supporting jacks 6 at the trailing end of the machine.

In actual practice I have found that in driving a tunnel of approximately 10 feet in diameter under usual conditions met with in practice, cutters of approximately 18 inches in diameter and about 4 inches in thickness operate successfully with the cutting head making about three revolutions per hour. Each bite in the face of the tunnel is to a depth of approximately 8 inches so that the advance of the tunnel is roughly two feet per hour. With jacks 28 having a 24 inch thrust, it is necessary to reposition the machine closer to the tunnel face only once every hour. The machine not only makes a clean bore into the earth but the speed of advance and the reduction of manpower required in driving a tunnel are factors materially lessening the cost of the operation. Furthermore, because my machine is able to penetrate rocks, no blasting is required such as is likely to shatter the rock, produce "over-break" and cause damage to adjacent buildings and property.

While I have described and illustrated a preferred embodiment of my invention, it is to be understood that various changes in the details of construction and arrangements of parts may be made without departing from the spirit of my invention as set forth in the following claims.

I claim:

1. A tunnel excavating machine comprising a machine frame, a carriage mounted thereon for translatory movement in a generally horizontal plane, a hollow, elongated cutting head located beyond the forward end of the carriage, a tubular head drive shaft rotatably supported upon the carriage and connected at its forward end with said cutting head at a point intermediate the extremities of the cutting head, a cutter drive shaft extending longitudinally within the head drive shaft and projecting therebeyond into the cutting head, a plurality of cutter shafts transversely mounted for rotation within the cutting head having their ends projecting outwardly beyond the cutting head, a disk-shaped rotary cutter mounted upon the projecting end of each cutter shaft, cutting teeth upon the rims and operating faces of the cutters, power transmission means within the cutting head extending between the cutter drive shaft and each of said cutter shafts, means for continuously rotating the cutter drive shaft, means for intermittently rotating said head, and means for periodically advancing said carriage relative to the supporting frame, whereby the cutters are adapted to initially cut a plurality of recesses perpendicular to the face of a tunnel and subsequently by rotation of the cutter head to cut a plurality of circular kerfs in said tunnel face.

2. A tunnel excavating machine as set forth in claim 1 in which the means for intermittently rotating the cutting head drive shaft comprises a ratchet mechanism including a ratchet wheel secured to the head drive shaft, a pawl engageable with the ratchet wheel, and means for reciprocating the pawl.

3. A tunnel excavating machine as set forth in claim 1 in which the means for intermittently rotating the cutting head drive shaft comprises a ratchet mechanism including a pair of ratchet wheels secured to the head drive shaft, said ratchet wheels having teeth angularly offset relative to one another, pawls engageable with the ratchet wheels, and means for alternately reciprocating the pawls.

4. A tunnel excavating machine as set forth in claim 1 in which the elongated, hollow cutting head is made in a plurality of relatively displaceable sections each containing a cutter shaft.

5. A tunnel excavating machine as set forth in claim 1 in which the machine frame comprises pairs of forward and rear legs and means for raising and lowering the pair of rear legs for tilting the frame upon its forward legs.

6. A tunnel excavating machine as set forth in claim 1 in which the means for periodically advancing the carriage relative to the supporting frame comprises a fluid-operated jack connected to and extending between the supporting frame and the carriage.

7. A tunnel excavating machine as set forth in claim 1 in which the means for intermittently rotating the head drive shaft and the means for periodically advancing the carriage relative to the supporting frame comprise fluid-operated jacks, and including manually-operated valves for controlling the flow of pressure fluid to and from said jacks.

References Cited in the file of this patent

UNITED STATES PATENTS

| | | |
|---|---|---|
| 9,185 | Howard | Aug. 10, 1852 |
| 307,379 | Craven | Oct. 28, 1884 |
| 556,985 | Hurd | Mar. 24, 1896 |
| 2,384,397 | Ramsay | Sept. 4, 1945 |